(12) United States Patent
Blanchard et al.

(10) Patent No.: US 11,393,265 B2
(45) Date of Patent: Jul. 19, 2022

(54) METHOD AND APPARATUS FOR MEASURING AND LOGGING THE PERFORMANCE OF A VEHICLE SUSPENSION SYSTEM

(71) Applicants: SMEDLEY'S ENGINEERS PTY LTD, Cremorne (AU); MALUVA ENGINEERING, New Romney (GB)

(72) Inventors: Mark Blanchard, New Romney (GB); Lydia Chong, Teneriffe (AU); Robert Smedley, Richmond (AU); Robert Wright, Richmond (AU)

(73) Assignees: SMEDLEY'S ENGINEERS PTY LTD, Cremome (AU); MALUVA ENGINEERING, New Romney (GB)

( * ) Notice: Subject to any disclaimer, the term of this patent is extended or adjusted under 35 U.S.C. 154(b) by 641 days.

(21) Appl. No.: 16/346,882

(22) PCT Filed: Nov. 1, 2017

(86) PCT No.: PCT/AU2017/051199
§ 371 (c)(1),
(2) Date: May 2, 2019

(87) PCT Pub. No.: WO2018/081855
PCT Pub. Date: May 11, 2018

(65) Prior Publication Data
US 2020/0066065 A1    Feb. 27, 2020

(30) Foreign Application Priority Data
Nov. 3, 2016   (AU) .............................. 2016904491

(51) Int. Cl.
*G07C 5/08* (2006.01)
*G01H 9/00* (2006.01)
*G01M 17/04* (2006.01)

(52) U.S. Cl.
CPC ............... *G07C 5/085* (2013.01); *G01H 9/00* (2013.01); *G01M 17/04* (2013.01)

(58) Field of Classification Search
CPC ........ G07C 5/085; G06F 17/40; G01M 17/04; G01H 9/00
See application file for complete search history.

(56) References Cited

U.S. PATENT DOCUMENTS 3,855,841 A   12/1974   Hunter
3,877,289 A    4/1975   Kckenney et al.
(Continued)

FOREIGN PATENT DOCUMENTS

AU           687190 B2    10/1995
CN         102649406 B     8/2012
(Continued)

OTHER PUBLICATIONS

Marius-Constantin O.S. Popescu, Nikos E. Mastorakis "Testing and Simulation of a Motor Vehicle Suspension" in International Journal of Systems Applications, Engineering & Development Issue 2, vol. 3, 2009 http://citeseerx.ist.psu.edu/viewdoc/download?doi=10.1.1.554.8465&rep=rep1&type=pdf.
(Continued)

*Primary Examiner* — Behrang Badii
(74) *Attorney, Agent, or Firm* — Mark M. Friedman

(57) ABSTRACT

A method for measuring and logging the performance of a wheeled vehicle suspension system by measuring the dynamic performance of at least one component of said vehicle suspension system, the method including the steps of: setting the vehicle on a pre-determined path and within a pre-determined speed range; causing the suspension of said vehicle to be displaced by a substantially predetermined amount by causing the wheels of the vehicle to roll over one or more objects of known size on said path; measuring the
(Continued)

displacement of said at least one suspension system component relative to the sprung mass of the vehicle and/or one or more fixed objects in response to said displacement; measuring the oscillation frequency of said at least one vehicle suspension system component in response to said displacement; and determining the suspension damping characteristics relating to the at least one vehicle suspension system component using the displacement and frequency measurements.

27 Claims, 4 Drawing Sheets

(56) References Cited

U.S. PATENT DOCUMENTS

| | | |
|---|---|---|
| 5,231,583 A | 7/1993 | Lizell |
| 5,369,974 A | 12/1994 | Tsymberov |
| 5,497,324 A * | 3/1996 | Henry ............... B60G 17/0157 280/5.503 |
| 5,569,836 A | 10/1996 | Hill |
| 5,767,382 A | 6/1998 | Buchanan |
| 5,942,673 A | 8/1999 | Horiuchi et al. |
| 6,360,580 B1 | 3/2002 | Müller |
| 6,418,360 B1 | 7/2002 | Spivey et al. |
| 7,512,520 B2 | 3/2009 | Sack et al. |
| 7,665,585 B2 | 2/2010 | Alexandridis |
| 7,778,748 B2 | 8/2010 | Probst et al. |
| 7,946,163 B2 | 5/2011 | Gartner |
| 8,321,177 B2 | 11/2012 | Sack et al. |
| 2004/0215380 A1 | 10/2004 | Song |
| 2007/0260372 A1 | 11/2007 | Langer |
| 2008/0039994 A1 | 2/2008 | Mannerfelt |
| 2010/0082202 A1* | 4/2010 | Moshchuk ......... B60G 17/0182 701/37 |
| 2011/0202236 A1 | 8/2011 | Galasso et al. |
| 2018/0079272 A1* | 3/2018 | Aikin .................... B60W 30/02 |
| 2019/0301978 A1 | 10/2019 | Geluk |

FOREIGN PATENT DOCUMENTS

| | | |
|---|---|---|
| CN | 103175696 A | 6/2013 |
| EP | 0647843 B1 | 4/1995 |
| GB | 2282784 A | 10/1994 |

OTHER PUBLICATIONS

Shen Yin ; Zenghui Huang "Performance Monitoring for Vehicle Suspension System" in IEEE/ASME Transactions on Mechatronics ( vol. 20 , Issue. 5, Oct. 2015 https://ieeexplore.ieee.org/abstract/document/6920037.

Rakheja,A.K.W. Ahmed,P. Liu.M.J. Richard "Dynamic Ride Properties of a Roll-Connected Vehicle Suspension" in Elsevier 2000 Link: https://www.sciencedirect.com/topics/engineering/vehicle-suspensions.

Rosen Miletiev, Ivaylo Simeonov, Emil Iontchev, Rumen Yordanov "Time and frequency analysis of the vehicle suspension dynamics" in International Journal of Systems Applications, Engineering & Development Issue 5, vol. 7, 2013 Link: http://www.naun.org/main/UPress/saed/f052014-125.pdf.

A. I. Fedotov, N. Y. Kuznetsov, A. V. Lysenko, and V. G. Vlasov "Car suspension system monitoring under road conditions" Cite as: AIP Conference Proceedings 1915, 040014 Dec. 12, 2017 Link: https://aip.scitation.org/doi/pdf/10.1063/1.5017362.

* cited by examiner

METHOD AND APPARATUS FOR MEASURING AND LOGGING THE PERFORMANCE OF A VEHICLE SUSPENSION SYSTEM

TECHNICAL FIELD

The invention relates to the field of transport equipment. In particular, the invention relates to an improved method and apparatus for the determination and logging of the performance of a vehicle suspension system in reaction to impulsive loads.

BACKGROUND OF THE INVENTION

Vehicles commonly employ a suspension system connected between the road wheels and the body of the vehicle, which are designed to absorb the vibrations generated by the travel of the vehicle's wheels over uneven running surfaces.

Methods for testing the performance of vehicle suspension systems are generally known. Conventional shock absorbers typically have a limited operating life, and therefore may need to be replaced when they no longer function properly. In order to determine if a shock absorber needs to be replaced, the simplest and most widely used conventional diagnostic testing approach typically involves a technician applying force to the vehicle fender, or elsewhere on the vehicle body, and visually detecting the rocking movement response of the vehicle. The resulting oscillations are often counted visually or by an oscillation measuring device attached to the vehicle. The conventional suspension testing approach therefore involves subjective interpretation by the technician which may not be consistently reliable. As can be appreciated, this test also cannot feasibly be applied to large vehicles, such as road haulage trucks or rail vehicles and the like.

Another test which may be applied is the European Drop Test for heavy road vehicles, in which a set of axles is mounted on a test rig and is driven over an inclined ramp with a sheer drop of approximately 80 mm on its facing edge. The damping ratio and frequency of the suspension is then measured using load cells and displacement transducers attached to the test rig.

The results gained in either of the above testing regimes may be inaccurate and/or inconclusive in that they do not accurately take into account the combined effect of vehicle mass, suspension geometry and shock absorber characteristics on the efficiency of the shock absorber in maintaining the vehicle's wheels in contact with the running surface while experiencing the running surface bumps which the vehicle normally encounters.

Also these simple tests do not take into account multiple axles coupled together in what is commonly called a suspension group, for example, a tandem axle group, tri axle group, quad axle group, and the like.

Second, testing of a shock absorber isolated from its operating environment is believed to be unsatisfactory as its dampening ability is measured against an arbitrary standard rather than relative to the suspension system of which it is a part. Because the suspension system as a whole affects the handling, ride, suspension performance, stability and safety of the vehicle and its effect on the pavements and road structures on which it operates, the practice of shock absorber testing as an isolated component can be seen to be unsatisfactory as a method of determining in-service performance of the suspension, or a suspension system as a whole unit in an operating environment.

Also, as the shock absorber must be removed from the vehicle in order to test its performance using the above described test, the vehicle must be removed from service for the length of the tests. This results in a loss of profits for the owner operator while the vehicle cannot be used during the period of downtime.

Other devices currently on the market, namely those operating on the 'seismograph' principle evaluate the suspension systems as a whole, but are restricted to recording movement of the vehicle's body without allowing the deduction of the dampening provided by the system, (i.e. shock absorber performance).

Any suspension testing systems that require the vehicle under test to be fitted with measuring equipment; or to be required to be partially dismantled; or to have the testing performed at a specially equipped facility; or for the vehicle to be removed from its normal operating environment or the like, suffers from the disadvantage of causing a loss of income to the vehicle operator for the duration of (at least) the testing and any necessary travel to and from the testing facility.

Accordingly, it is desirable to provide for an accurate test procedure for testing the performance of vehicle suspension systems and components that overcomes the above described shortcomings, and which preferably does so without requiring the removal of the vehicle from service, and/or without the necessity to either temporarily or permanently fit measuring equipment to the vehicle. In addition, it is desirable to provide for a test procedure for testing vehicle suspension components that does not require subjective interpretation by a technician.

SUMMARY OF THE INVENTION

The present invention is directed to a method for measuring and logging the performance of a vehicle suspension system, which may at least partially overcome the above-mentioned disadvantages or provide the consumer with a useful or commercial choice.

According to a first aspect of the invention, there is provided a method for measuring and logging the performance of a wheeled vehicle suspension system by measuring the dynamic performance of at least one component of said vehicle suspension system, the method including the steps of: setting the vehicle on a pre-determined path and within a pre-determined speed range; causing the suspension of said vehicle to be displaced by a predetermined amount by causing the wheels of the vehicle to roll over one or more objects or features of known size on the running surface on said path; measuring the displacement of said at least one suspension system component relative to the sprung mass of the vehicle and/or one or more fixed objects in response to said displacement; and/or measuring the oscillation frequency of said at least one vehicle suspension system component in response to said displacement: and determining the suspension damping characteristics relating to the at least one vehicle suspension system component using the displacement and frequency measurements obtained.

The 'sprung mass' as recited above will be understood to mean all parts of the vehicle that are suspended on the suspension system, such as body, tray, cab and the like. It will be the relative movement of the at least one suspension system component to these sprung mass components that is of interest and is required to be measured.

Preferably, the means for measuring said displacement is an optical device, such as a camera, mounted separately from the vehicle, and the analysis includes a digital analysis of one or more images of said vehicle in order to compute displacement and frequency.

Preferably, the objects over which the vehicle drives in order to induce vibration in the suspension are one or more ramps. These may extends above or below the level of the surrounding running surface. They may also be of varying geometry, provided they induce a detectable and useful displacement and vibration in the suspension. Furthermore, the feature over which the vehicle drives in order to induce vibration in the suspension may be variable in form, displacement and retractable.

More preferably, the method further includes the step of comparing the measured performance of the vehicle suspension to a pre-determined standard.

Advantageously, any deviation of the optical measuring system is measurable against the fixed datum point of said fixed object in the locality of the vehicle.

Preferably, the location of the at least one suspension system component, or the sprung mass, is measurable against the fixed datum point of said fixed object in the locality of the vehicle.

Now will be described, by way of a specific, non-limiting example, a preferred embodiment of the invention with reference to the drawings.

DETAILED DESCRIPTION OF THE INVENTION

Figure 1:
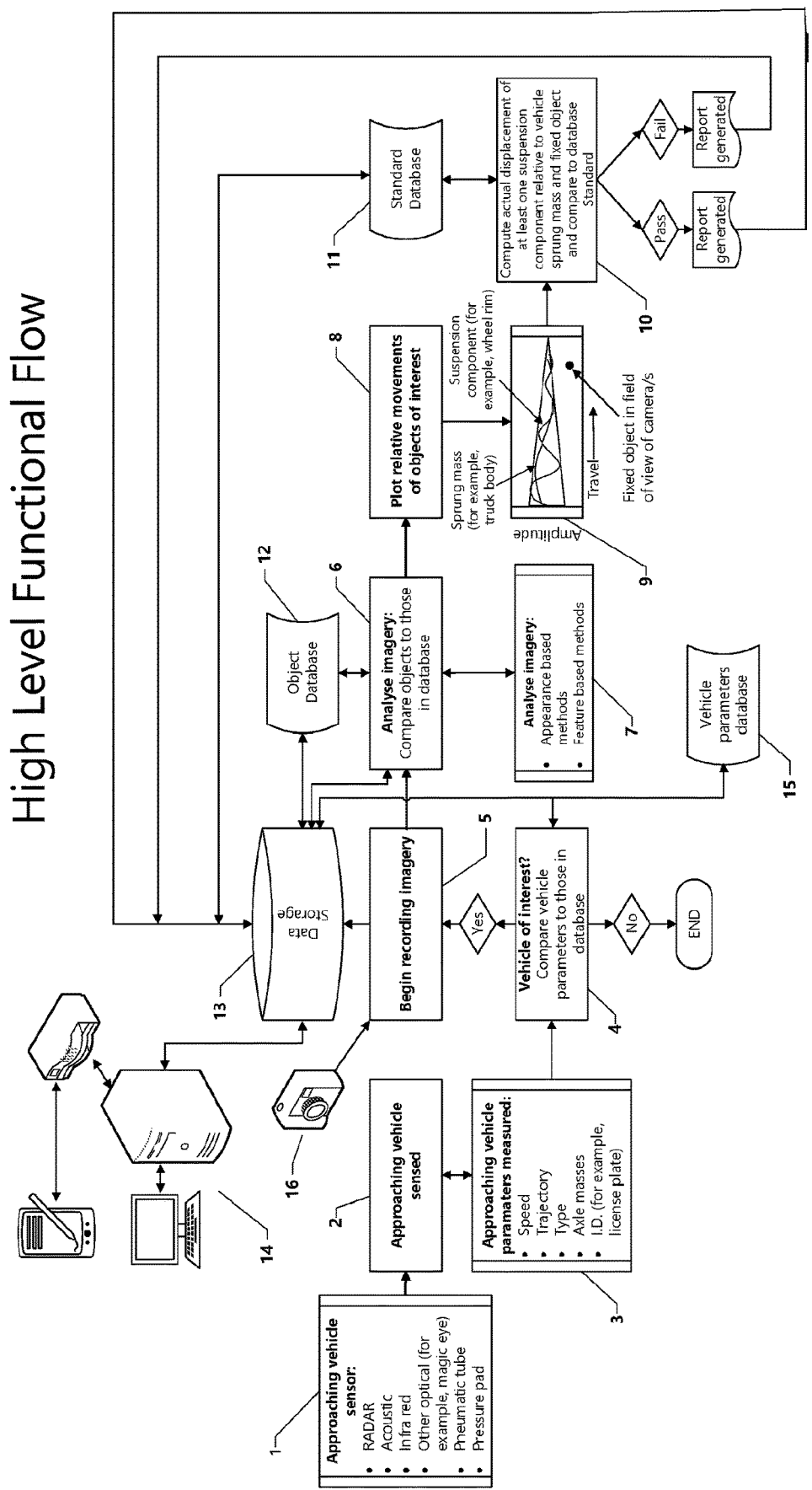
FIG. 1 shows high level functional flow for the present invention.

Within Australia, with the introduction of the Intelligent Access Project (IAP) under the National Road Transport Commission (NRTC) guidelines and with the introduction of Performance Based Standards (PBS), haulage or freight trucks may be required to comply with standards which relate to the performance of suspension and suspension components, as a whole or as a group of axles.

Under the IAP and the PBS guidelines, a vehicle suspension may be required to meet performance standards in order to maintain the compliance of the vehicle and its fitness for service. This compliance testing may test one or more parameters of the suspension which determine the "road friendliness" of the suspension. A "road friendly suspension" may be one which functions within predetermined limits for one or more of the parameters, and attaining or complying with "road friendliness" may provide advantages for the owner/operator of the vehicle such as the ability to carry heavier loads or access to roads which non-compliant vehicles may be restricted from using. As well, the road friendly performance of the suspension/s will affect the working life of the road itself with attendant reduction in maintenance costs and increased safety to all road users, with the economic benefits of such savings flowing on to the general community. The compliance of the suspension is generally tested periodically over the life of the vehicle or of the vehicle suspension.

The method described herein is preferably used to test the "road friendliness" of the suspension of a vehicle and is capable of doing so whilst the vehicle is substantially in its normal operating environment. Road friendliness is assessed by various regulatory bodies (e.g. the National Heavy Vehicle Regulator). Compliant road friendly suspension is a requirement to eligibility for participation in such schemes as Higher Mass Limits (HML), Concessional Mass Limits (CML) and is therefore an important commercial consideration for transport operators. Demonstration of compliance for road friendly suspension is normally undertaken at the product design and verification stage, however, demonstration of compliance following a period of use is requires the vehicle to be taken out of routine operational service.

In one embodiment, the invention resides in a method for measuring and logging the performance of a vehicle suspension system including the steps of setting the vehicle on a pre-determined path and within a pre-determined speed range and measuring unit suspension displacement due to a running surface located feature, wherein the displacement measuring system is external to the vehicle, and determining one or more parameters selected from a group consisting of the damping ratio of the suspension, the frequency of oscillation of the suspension and the instantaneous proportional loading of the suspension at any point of the oscillation.

In order for road friendly suspensions to be considered compliant, they are required to have a predetermined damping ratio. The damping ratio is a dimensionless measure describing how oscillations in a system decay after a disturbance. Many systems exhibit oscillatory behaviour when they are disturbed from their position of static equilibrium. Preferably, components of the suspension performance logging system mounted external to the vehicle are used to measure, and or collect data used in accordance with the method of the present invention to calculate the damping ratio and frequency of oscillation of the at least one suspension system component.

Typical suspension displacement measuring systems include linear position transducers, load cells, accelerometers, and impulse inducing apparatus. According to a preferred embodiment of the invention, the optical displacement measuring device of the present invention is capable of accurately measuring and logging the unit displacement of at least one suspension system component while the vehicle is in routine operational service and a data processing function then performing computations to establish the amplitude of such displacements, rates of oscillation and suspension position.

The optical means (e.g. digital camera) is required to be of sufficient resolution to facilitate the detection of small, e.g. in the order of a few millimetres or less to ensure sufficient resolution of data gathered, unit suspension displacements relative to both the sprung mass of the vehicle and reference or datum objects in the vehicle's locality and in the field of view of the camera.

When a running surface feature causes the displacement of at least one unit suspension component of a vehicle in motion, the relative position of the at least one unit suspension component together with the sprung components of the vehicle in relation to each other and/or a fixed datum object/s in the locality of the vehicle can be continuously measured.

In order that the damping ratio can be then computed, the positional difference of the at least one unit suspension component of a vehicle in motion relative to the sprung components of the vehicle and/or a fixed object/s in the locality of the vehicle can be logged over a time period. The resulting decrease in amplitude of the at least one unit suspension component over a measured time period is a measure of damping ratio per cycle of oscillation, which is the frequency of oscillation in Hertz.

The ability to measure the relative positional difference of the at least one unit suspension component of a vehicle in motion relative to the sprung components of the vehicle and/or a fixed object/s in the locality of the vehicle is facilitated by optical means. Advantageously, the application to the vehicle of especially optically detectable feature/s, such as reflective material may be employed to improve detection of object/s and hence improve system capability and accuracy.

In one embodiment of the present invention, a fixed digital camera of sufficiently wide field of view for example, a correctly configured DITECT HAS-U2M (max 100 fps at 2592×2048 resolution) is positioned adjacent a highway on which vehicles are to be observed.

Turning to FIG. 1, there is shown an embodiment of the invention. A brief description of the numbered elements relating to the invention and a description of their function follow.

When a vehicle approaches the apparatus, its proximity is sensed by 1, approaching vehicle sensor. This is a means by which the apparatus is initiated by way of detecting the proximity of an approaching vehicle. A number of sensor options exist that are well established and understood that may be adapted to suit functional requirements.

After the proximity of a vehicle is sensed, at 2, certain parameters of the approaching vehicles' characteristics may be measured and logged, these may include but not be limited to speed, trajectory, type, axle masses, and identification as show at 3.

The vehicle characteristics measured at 3 may then be compared to those stored in a vehicle parameters database, 4 and a decision made as to whether the approaching vehicle is to be analysed further.

If the approaching vehicle is a vehicle not selected for further analysis, (indicated by 'No' on the flow chart) then the system returns to its initial state of readiness to sense an approaching vehicle.

If the approaching vehicle is a vehicle selected for further analysis, based upon its parameters, (indicated by 'Yes' on the flow chart) then the system triggers a camera/s 16, to begin capturing and storing imagery in a Data Storage device, 13.

Analysis of the captured imagery takes place at 6, referring to the Object Database 12, employing any of a number of object recognition techniques, some of which by way of example are shown at 7, in order to detect matching patterns, shapes or other attributes that objects of interest exhibit, and track their respective positions relative to one another, and to at least one fixed object in the field of view of the camera/s 16.

Once the relative positions of the objects of interest are identified, their positions relative to one another are plotted 8, leading to a numeric and/or or graphical representation of the movement of the objects of interest, with particular regard to amplitude and frequency over a distance travelled 9.

Once relative positions of the objects of interest are established 8 and 9, computation is performed to establish the actual measured displacement of each object of interest relative to another 10, with the focus of the computation being to subtract from the position of one object of interest (for example a wheel rim or hub) the position of the vehicle sprung mass (for example a truck body) so as to compute the actual displacement at any data point of one object of interest (for example a wheel rim or hub) in relation to another object of interest (for example a truck body) to result in a refined output that numerically and/or graphically shows the actual measured displacement of, for example, a wheel rim to a truck body as the vehicle travels past the camera/s 16.

The computed values that reveal the measured distance (or displacement) of for example, a wheel rim to a truck body as the vehicle travels past the camera/s 16, over a suitable travelled distance of the vehicle, are then compared to a standard from the Standard Database 11. If the values of displacement are outside of those established by the standard, a fail will result (indicated by 'Fail' on the flow chart) and a corresponding report generated and sent to Data Storage 13. Similarly, the values of displacement are within of those established by the standard, a pass will result (indicated by 'Pass' on the flow chart) and a corresponding report generated and sent to Data Storage 13.

Communications apparatus 14 may be configured to relay information from Data Storage 13 or other parts of the apparatus to other remote information interfaces and for control functions to be performed from such remote interfaces.

A vehicle proximity detector 1, which may include any of the types shown in FIG. 1, arranged to detect an approaching vehicle initiates the system and imagery of the vehicle is collected and logged as the vehicle passes the camera. A high resolution, high speed camera will provide greater accuracy, for example, a correctly configured DITECT HAS-U2M (max 100 fps at 2592×2048 resolution) may meet system requirements.

The number of cameras required is dependent on the field of view of each camera, which is in turn dependent on their distance from the subject, the distance over which the subject is to be tracked and the specific capabilities of the particular camera. A particular set-up of apparatus and the number of cameras required will take into account many such factors, but ultimately a number of oscillations of an excited suspension that provides sufficient reliability as to the amount the amplitude of oscillation diminishes over a number of cycles (the damping ratio) will be a key determinant, as will vehicle speed range.

External light sources that provide sufficient illumination, such as fluorescent lights, may be employed to enhance the imagery obtained and ensure reliable image capture and object tracking capability. Depending on environmental factors, a light source that minimises shadows and illuminates well the objects of interest may be required. A typical arrangement would be a linear array of light sources at low level along the vehicle path, spaced to provide consistent light (illuminance uniformity) and directed toward the side of the vehicle. Shrouding may be employed to minimise unwanted stray light and initiation of lighting may be linked to the detection of an approaching vehicle by the approaching vehicle sensor at 1 of FIG. 1. Specific characteristics of the light source will consider the local environment and requirements of the image capture and analysis apparatus, and would typically consider illuminance level, illuminance uniformity, colour temperature (CCT), colour temperature uniformity, flicker and colour rendering. The system may rely on light outside of the visible spectrum, such as infrared.

The imagery is then processed as shown in FIG. 1 to obtain information as to the positional difference of the at least one unit suspension component of the vehicle relative to the sprung components of the vehicle and/or a fixed object/s in the locality of the vehicle in relation to time, as the vehicle passed the camera, or subsequently form stored data.

Figure 2:
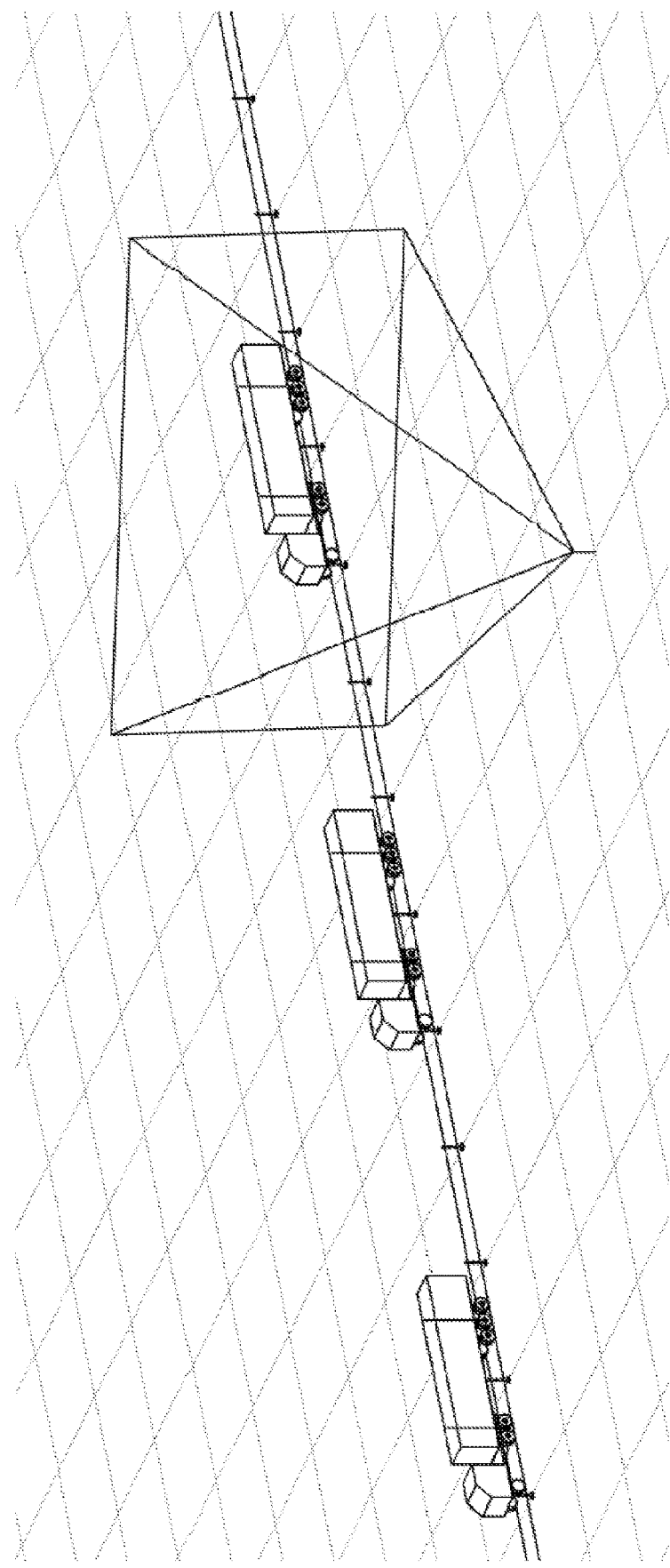
FIG. 2 shows a typical arrangement according to the invention where a single camera or polar array of cameras is employed.

Turning to FIG. 2, there is shown a typical arrangement where a single camera or polar array of cameras is employed. The vehicle travels on its path proximate to the at least one stationary object in the field of view of the camera/s, in this example, equally spaced bollards are shown. As the vehicle travels on its path, the camera/s record imagery of the vehicle and bollards, as well as the vehicle's local environment, for subsequent analysis. A unique reference on each bollard may be used to allow the refining of imagery gathered so that it is duly compensated for distance from camera, and hence displacements measured are accurate.

Dependent on environmental conditions, camera specific requirements or other lighting considerations, a light strobe may be employed to capture instantaneous positioning of suspension/sprung mass/fixed object relationship, for later processing and results analysis.

Dependent on environmental conditions or particulate site attributes, or for the purpose of providing the best image capture solution, a camera/s that rotate about a vertical axis, rather than a linear array of data connected cameras substantially parallel to the vehicle's path, or a camera/s that moves linearly with and substantially synchronised to the forward movement of the vehicle may be employed, the rotational speed of which will be directly proportional to the velocity of the vehicle, as measured at point 3 in FIG. 1, and which may be accurately controlled by the use of object recognition from the image capture outputting a signal to a camera rotation actuator to maintain the position of the tracked object with respect to the vehicle speed (thereby maintaining a nominally matched position within the frame of the components under scrutiny).

Dependent on environmental conditions or particulate site attributes, or for the purpose of providing the best image capture solution, multiple data and control linked cameras to effectively increase the field of view by spanning a longer distance of observation of the vehicle under scrutiny may be employed.

Under certain circumstances, where for example the effects of side winds may cause vehicle body roll, advantageously, the image capture and analysis apparatus may be installed on either side of the vehicle's path to contemporaneously capture imagery for analysis, data connected for synchronisation.

Focus of the camera/s occurs may occur, as is common, by the use of one or more integral sensors to determine correct focus and to detect whether the subject is moving toward or away from the camera, including speed and acceleration data, and to maintain focus, sometimes referred to as "continuous focus". An object proximate to the commencement zone of the vehicle path where image capture is to take place may be identified as a focal point for ready calibration of a camera/s, or objects parallel to the vehicle's path for the same purpose where a linear array of cameras is to be employed.

Figure 3:
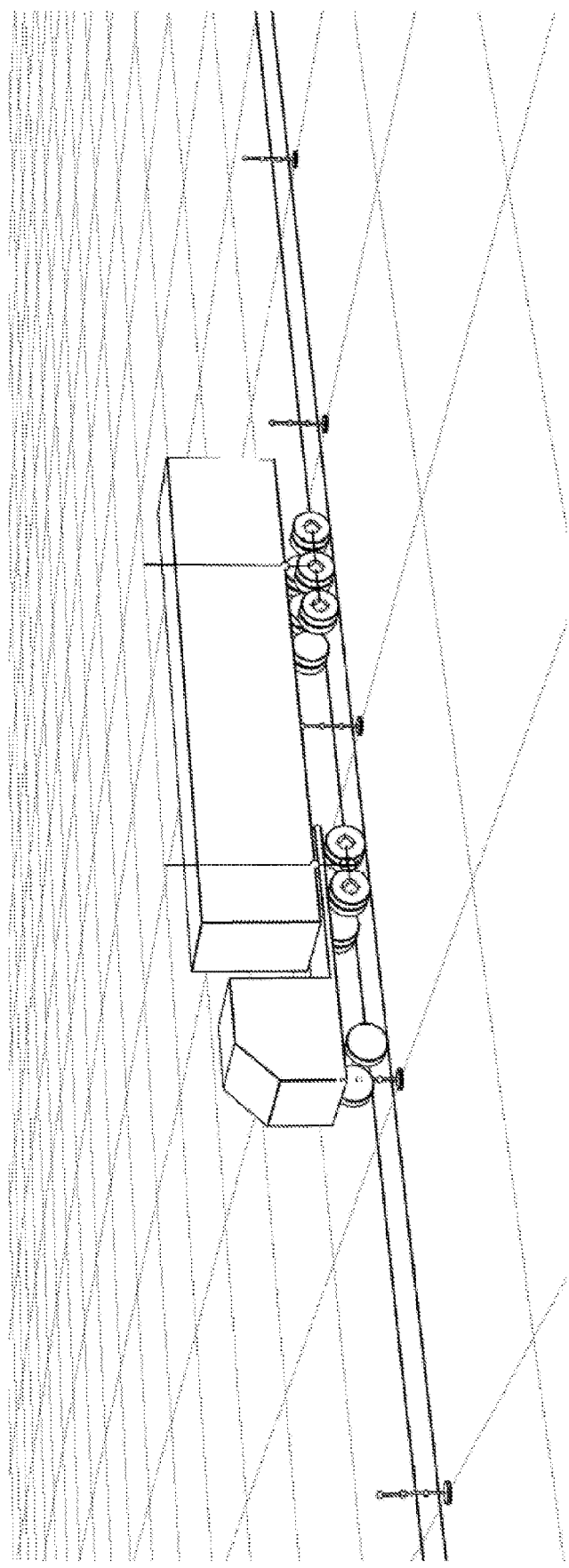
FIG. 3 shows a close-up perspective of a vehicle travelling on its path past equally spaced bollards.

Turning to FIG. 3, there is shown a close-up perspective of a vehicle travelling on its path past equally spaced bollards. Imagery obtained would be processed to track the positions of the bollards, axles (by recognising and tracking a prominent, concentric feature of each, such as a hub or rim) and a suitable prominent feature of the sprung mass of the vehicle, proximate to the axle group of interest.

Figure 4:
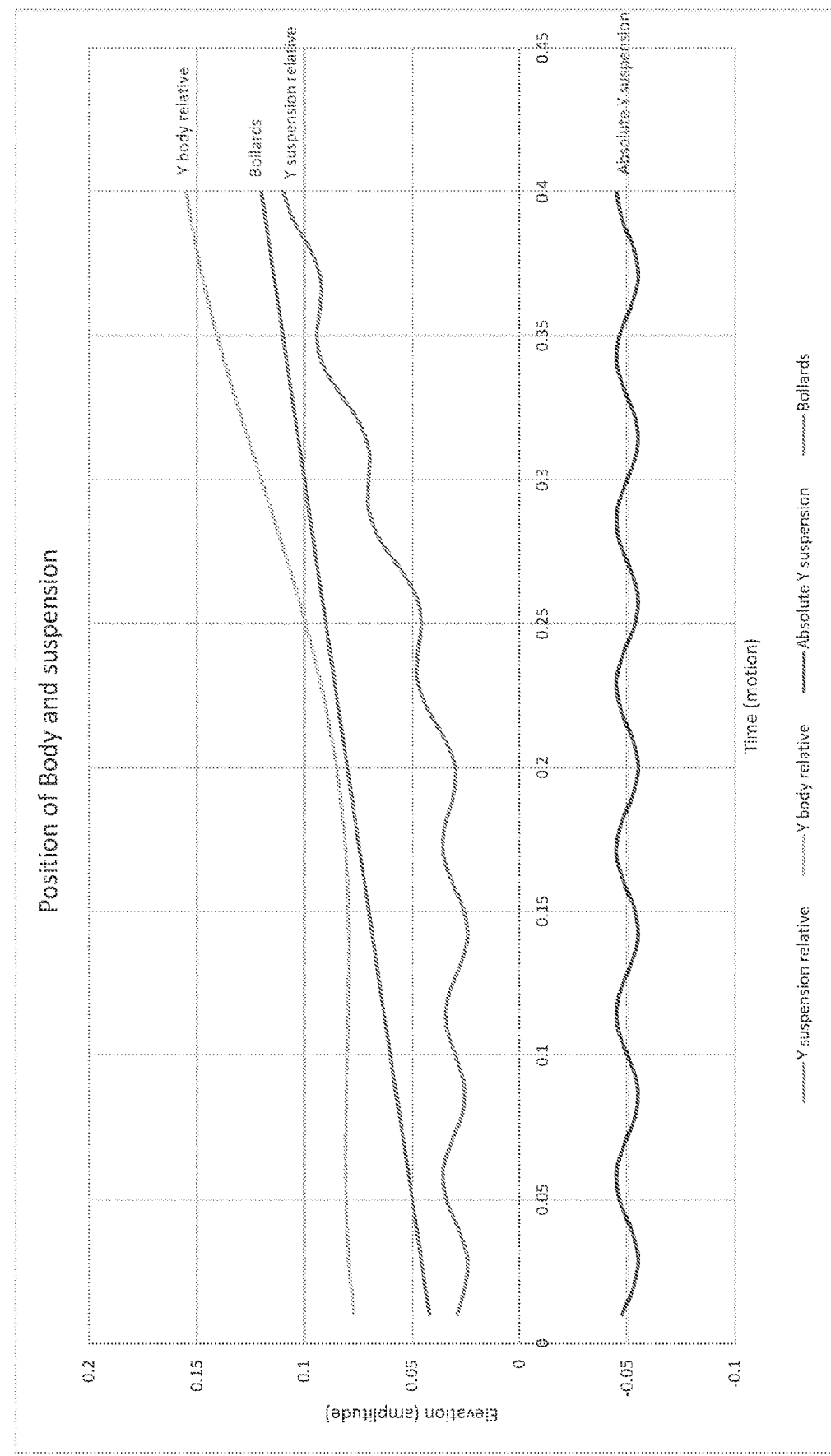
FIG. 4 shows a graphical representation of tracked objects of interest and is discussed in detail later in this patent specification.

FIG. 4 shows a graphical representation of tracked objects of interest, where:
- the grey (Y suspension relative) plot is the displacement on the Y (vertical) axis of the at least one suspension component relative to the at least one fixed object (bollard/s),
- the yellow plot (Y body relative) is the displacement on the Y (vertical) axis of the vehicle sprung mass (for example, body) relative to the at least one fixed object (bollard/s),
- the dark blue plot (Absolute Y suspension) is the refined (absolute) plot on the Y (vertical) axis of the at least one suspension component relative to the vehicle sprung mass (for example, body).
- the light blue plot (bollards) is that recorded by the camera/s and shows their perceived changing elevation as the bollards appear each in turn farther away from the camera/s. This reference is used as the datum for deduction of the position of the at least one suspension component minus the vehicle sprung mass (for example, body) at any time.

Where pixel size presents an obstacle to resolution of the imagery captured (as spatial issue), which could occur particularly when the subject is at a greater distance from the camera/s, or an issue where the speed of movement of the object tracked is fast compared to the frame capture frequency of the camera, the ability to track the object accurately is diminished. For the latter issue, increasing the frequency of capture may alleviate the problem, for the former, other techniques exist to compensate for such problems. In general, tracking methods can only detect movements when the object has moved a complete pixel in the image. Subpixel techniques allow detecting movements smaller than a single pixel:
- The simplest approach presently known to the inventors consists of detecting pixel groups that share a common feature or features and follow this feature structure along an image sequence. Calculation of the object (feature) centroid locates the object in the scene. As long as the common feature remains through all images in the sequence, the object will be detected and tracked. Sub-pixel resolution arises as a statistical effect since the centroid is calculated taking into account a high number of pixels.
- An alternative approach consists of taking the objects that share a common feature and constructing an analytical model whose geometrical properties can be accurately calculated, for example, a circle that represents a wheel rim or hub, that when detected movement is half a pixel to the Left in the x axis, will cause some pixels to capture the object, whilst others will not. Although the structure has not moved a whole pixel to the Left, the geometrical bindings imposed on the target allow tracing the new contour and obtaining the new position.

Other methods also exist that may lend themselves to the tracking of the objects of interest at a sub-pixel level where required, in the present invention, and may be known to the person skilled in the art.

It will be appreciated by those skilled in the art that the above described embodiment is merely one example of how the inventive concept can be implemented. It will be understood that other embodiments may be conceived that, while differing in their detail, nevertheless fall within the same inventive concept and represent the same invention.

The invention claimed is:

1. A method for measuring and logging the performance of a wheeled vehicle suspension system of a large road-going vehicle, such as a heavy lorry, while said vehicle is being operated on a road, by measuring the dynamic performance of at least one component of said vehicle suspension system, the method including the steps of:
   setting the vehicle on a pre-determined path and within a pre-determined speed range;
   causing the suspension of said vehicle to be displaced by a substantially predetermined amount by causing the wheels of the vehicle to roll over one or more objects of known size on said path;
   measuring the displacement, using at least one camera, of said at least one suspension system component relative to one or more pre-defined fixed objects disposed proximate the path of the vehicle and the displacement of the sprung mass of the vehicle relative to the one or more predefined fixed objects to determine the actual displacement of said at least one suspension system component relative to the sprung mass of the vehicle, the at least one camera being mounted separately from the vehicle; and
   measuring the oscillation frequency of said at least one vehicle suspension system component in response to said displacement; and
   determining the suspension damping characteristics relating to the at least one vehicle suspension system component using the displacement and frequency measurements.

2. The method of claim 1 wherein the measuring means includes a digital analysis of one or more images of said vehicle.

3. The method of claim 2 wherein the measuring means includes appearance based object tracking.

4. The method of claim 2 wherein the measuring means includes feature based object tracking.

5. The method of claim 2 wherein the measuring means includes the digital analysis of the images captured by the optical device in order to compute displacement and frequency.

6. The method of claim 1, wherein said one or more objects causing the suspension of said vehicle to be displaced by a substantially predetermined amount include one or more ramps extending below the level of the surrounding running surface.

7. The method of claim 5, further including the step of automatically comparing the measured displacement and frequency of the vehicle suspension to a pre-determined standard from a data-connected standard database.

8. The method of claim 1 wherein said vehicle is artificially illuminated by a light source mounted separate from the vehicle.

9. The method of claim 8 wherein the light is in the visible wavelength range.

10. The method of claim 8 wherein the light is in the non-visible wavelength range.

11. The method of claim 8 wherein the light is a strobe light in either the visible or non-visible wavelength range.

12. The method according to claim 1 wherein the vehicle is a heavy freight vehicle.

13. The method according to claim 1 wherein the vehicle is an off-road oriented passenger vehicle.

14. The method according to claim 1 wherein the vehicle is an automated vehicle.

15. The method according to claim 3 wherein the object detected and tracked is that of an axle component/s.

16. The method according to claim 3 wherein the object detected is a purposely applied especially optically detectable feature on the sprung mass of the vehicle.

17. The method according to claim 3 wherein the object detected is a purposely applied especially optically detectable feature on the unsprung mass of the vehicle.

18. The method according to claim 5 wherein any deviation of the optical measuring system is measurable against said one or more pre-defined fixed objects.

19. The method according to claim 5 wherein the location of the at least one suspension system component is measurable against said one or more pre-defined fixed objects.

20. The method according to claim 5 wherein the location of the sprung mass is measurable against said one or more pre-defined fixed objects.

21. The method according to claim 1 wherein more than one camera is used on any side of said vehicle.

22. The method according to claim 21 wherein the camera/s is fixed.

23. The method according to claim 21 wherein the camera/s is free to rotate about a vertical axis.

24. The method according to claim 21 wherein the camera/s is free to travel substantially parallel to the subject vehicle in the direction of travel.

25. The method according to claim 21 wherein said multiple cameras are arranged in a linear array.

26. The method according to claim 21 wherein the cameras are data connected.

27. The method according to claim 18 wherein said one or more pre-defined fixed objects are strategically arranged at various distances from the camera.

* * * * *